United States Patent
Sercel et al.

(10) Patent No.: US 11,566,521 B2
(45) Date of Patent: Jan. 31, 2023

(54) SYSTEMS AND METHODS FOR RADIANT GAS DYNAMIC MINING OF PERMAFROST

(71) Applicant: Trans Astronautica Corporation, Lake View Terrace, CA (US)

(72) Inventors: Joel C. Sercel, Lake View Terrace, CA (US); Philip J. Wahl, Altadena, CA (US); Craig E. Peterson, Los Angeles, CA (US); James G. Small, Sonoita, AZ (US)

(73) Assignee: Trans Astronautica Corporation, Lake View Terrace, CA (US)

( * ) Notice: Subject to any disclaimer, the term of this patent is extended or adjusted under 35 U.S.C. 154(b) by 0 days.

(21) Appl. No.: 17/448,349

(22) Filed: Sep. 21, 2021

(65) Prior Publication Data

US 2022/0090500 A1   Mar. 24, 2022

Related U.S. Application Data (60) Provisional application No. 63/081,836, filed on Sep. 22, 2020.

(51) Int. Cl.
*E21C 51/00* (2006.01)
(52) U.S. Cl.
CPC .................................. *E21C 51/00* (2013.01)
(58) Field of Classification Search
CPC ....................................................... E21C 51/00
See application file for complete search history.

(56) References Cited

U.S. PATENT DOCUMENTS

| | | | |
|---|---|---|---|
| 2,930,187 A | 3/1960 | Chillson |
| 2,975,592 A | 3/1961 | Fox |
| 2,991,617 A | 7/1961 | Rad |
| 3,063,521 A | 11/1962 | Fuller |
| 3,064,418 A | 11/1962 | Sanders |
| 3,564,253 A | 2/1971 | Buckingham |
| 3,597,923 A | 8/1971 | Simon |
| 4,013,885 A | 3/1977 | Blitz |
| 4,135,489 A | 1/1979 | Jarvinen |
| 4,286,581 A | 1/1981 | Atkinson, Jr. |
| 4,449,514 A | 5/1984 | Selcuk |
| 4,459,972 A | 7/1984 | Moore |
| 4,528,978 A | 7/1985 | Robinson |
| 4,564,275 A | 1/1986 | Stone |
| 4,781,018 A | 11/1988 | Shoji |
| 4,815,443 A | 3/1989 | Vrolyk |
| 5,047,654 A | 9/1991 | Newman |
| 5,138,832 A | 8/1992 | Pande |
| 5,202,541 A | 4/1993 | Patterson |

(Continued)

FOREIGN PATENT DOCUMENTS

JP  2019148155 A  * 9/2019

*Primary Examiner* — Janine M Kreck
(74) *Attorney, Agent, or Firm* — Knobbe, Martens, Olson & Bear, LLP (57) ABSTRACT

Systems and apparatus are disclosed for mining the permafrost at the landing sites using radiant gas dynamic mining procedures. The systems can comprise a rover vehicle with an integrated large area dome for cryotrapping gases released from the surface and multi-wavelength radiant heating systems to provide adjustable heating as a function of depth. Various antenna arrays and configurations are disclosed, some of which can cooperate for a specific aiming or targeting effect.

22 Claims, 6 Drawing Sheets

(56) References Cited

U.S. PATENT DOCUMENTS

| | | | |
|---|---|---|---|
| 5,266,762 A | 11/1993 | Hoffman | |
| 5,305,970 A | 4/1994 | Porter et al. | |
| 5,459,996 A | 10/1995 | Malloy, III | |
| 5,511,748 A | 4/1996 | Scott | |
| 5,593,549 A | 1/1997 | Stirbl et al. | |
| 5,674,794 A | 10/1997 | Chatterjee | |
| 5,751,895 A * | 5/1998 | Bridges | E21B 47/13 392/306 |
| 5,861,947 A | 1/1999 | Neumann | |
| 5,982,481 A | 11/1999 | Stone | |
| 6,057,505 A | 5/2000 | Ortabasi | |
| 6,193,193 B1 | 2/2001 | Sorrano | |
| 6,343,464 B1 | 2/2002 | Westerman | |
| 6,350,973 B2 | 2/2002 | Wroe | |
| 6,532,953 B1 | 3/2003 | Blackmon et al. | |
| 6,669,148 B2 | 12/2003 | Anderman et al. | |
| 6,742,325 B2 | 6/2004 | Kudija, Jr | |
| 7,207,327 B2 | 4/2007 | Litwin | |
| 7,387,279 B2 | 6/2008 | Anderman et al. | |
| 7,575,200 B2 | 8/2009 | Behrens et al. | |
| 7,823,837 B2 | 11/2010 | Behrens et al. | |
| 8,033,110 B2 | 10/2011 | Gilon et al. | |
| 8,357,884 B1 * | 1/2013 | Ethridge | H05B 6/80 219/679 |
| 8,379,310 B2 | 2/2013 | Mori et al. | |
| 9,010,317 B1 | 4/2015 | Gross | |
| 9,187,191 B1 | 11/2015 | Jensen et al. | |
| 9,222,702 B2 | 12/2015 | Goldberg | |
| 9,266,627 B1 | 2/2016 | Anderson | |
| 9,409,658 B1 | 8/2016 | Diamandis et al. | |
| 9,581,021 B2 | 2/2017 | Ethridge | |
| 9,676,499 B2 | 6/2017 | Myers et al. | |
| 9,709,771 B2 | 7/2017 | Corrigan | |
| 10,654,596 B1 | 5/2020 | Eller | |
| 10,989,443 B1 | 4/2021 | Sercel et al. | |
| 11,085,669 B2 | 8/2021 | Sercel | |
| 11,143,026 B2 * | 10/2021 | Sercel | E21C 37/16 |
| 11,280,194 B2 | 3/2022 | Sercel | |
| 11,391,246 B2 | 7/2022 | Sercel et al. | |
| 2002/0075579 A1 | 6/2002 | Vasylyev et al. | |
| 2002/0184873 A1 | 12/2002 | Dujarric | |
| 2003/0029969 A1 | 2/2003 | Turner | |
| 2003/0224082 A1 | 12/2003 | Akopyan | |
| 2004/0004184 A1 | 1/2004 | Schubert | |
| 2004/0231716 A1 | 11/2004 | Litwin | |
| 2008/0023060 A1 | 1/2008 | Grumazescu | |
| 2008/0156315 A1 | 7/2008 | Yangpichit | |
| 2010/0038491 A1 | 2/2010 | Cepollina et al. | |
| 2010/0252024 A1 | 10/2010 | Convery | |
| 2010/0269817 A1 | 10/2010 | Kelly | |
| 2010/0294261 A1 | 11/2010 | Deforge | |
| 2010/0319678 A1 | 12/2010 | Maemura et al. | |
| 2011/0031238 A1 | 2/2011 | Segawa | |
| 2011/0041894 A1 | 2/2011 | Liao | |
| 2011/0220091 A1 | 9/2011 | Kroyzer | |
| 2011/0315678 A1 | 12/2011 | Furuya | |
| 2012/0155966 A1 | 6/2012 | Zillmer | |
| 2013/0021471 A1 | 1/2013 | Waterhouse | |
| 2013/0206209 A1 | 8/2013 | Lasich | |
| 2013/0239952 A1 | 9/2013 | Kroyzer | |
| 2014/0138952 A1 | 5/2014 | Marumoto | |
| 2014/0150651 A1 | 6/2014 | Velasco Valcke | |
| 2014/0174430 A1 | 6/2014 | Fitzgerald et al. | |
| 2014/0262278 A1 | 9/2014 | Walton | |
| 2014/0318127 A1 | 10/2014 | Kerns | |
| 2015/0027102 A1 | 1/2015 | Bahn et al. | |
| 2015/0180114 A1 | 6/2015 | Achour | |
| 2016/0010442 A1 * | 1/2016 | Kearl | E21B 43/2401 166/305.1 |
| 2016/0024921 A1 * | 1/2016 | Ethridge | H05B 6/80 219/385 |
| 2016/0076792 A1 | 3/2016 | Magaldi | |
| 2016/0121395 A1 | 5/2016 | Kawanaka | |
| 2018/0194626 A1 | 7/2018 | Berggren et al. | |
| 2019/0271228 A1 * | 9/2019 | Sowers, Jr. | F24S 21/00 |
| 2021/0061494 A1 | 3/2021 | Belieres Montero | |
| 2021/0333019 A1 | 10/2021 | Sercel et al. | |
| 2022/0046612 A1 | 1/2022 | Sercel et al. | |
| 2022/0082019 A1 | 3/2022 | Sercel et al. | |
| 2022/0089302 A1 | 3/2022 | Sercel et al. | |
| 2022/0268524 A1 | 8/2022 | Small | |
| 2022/0275721 A1 | 9/2022 | Sercel | |

* cited by examiner

SYSTEMS AND METHODS FOR RADIANT GAS DYNAMIC MINING OF PERMAFROST

INCORPORATION BY REFERENCE TO ANY PRIORITY APPLICATIONS

This application is based upon and claims the benefit of priority from U.S. Provisional Patent Application No. 63/081,836 filed on Sep. 22, 2020. Moreover, any and all applications for which a foreign or domestic priority claim is identified in the Application Data Sheet as filed with the present application are hereby incorporated by reference under 37 CFR 1.57. The entire contents of each of the above-listed items is hereby incorporated into this document by reference and made a part of this specification for all purposes, for all that each contains.

BACKGROUND

The present disclosure relates to systems, methods, apparatus, and techniques for the in situ lunar or Martian removal of water from permafrost, e.g., for the purpose of generating propellants.

SUMMARY OF CERTAIN INVENTIVE ASPECTS

Aspects of this disclosure relate to a method for mining lunar polar permafrost to extract gas propellants, comprising: providing a rover vehicle for mining permafrost from a landing site, the rover vehicle configured to combine radio frequency (RF), microwave, and infrared radiation to heat the permafrost at a depth control heating profile; lowering a dome from the rover vehicle to a surface of the landing site, the dome having a conformable skirt configured to increase gas collection efficiency and a plurality of infrared heaters configured to warm the surface of the mining location, the interior surface of the skirt having arranged thereon a plurality of phased wire dipole antennas arranged in a plurality of broadside arrays; deploying from the rover vehicle a plurality of drilling devices configured to enable subsurface RF heating; sublimating ice at a predetermined depth, using a combination of radiation sources, to cause water vapor to migrate upward and out of the permafrost; using a rotating belt to capture cryogenic vapors; and storing the vapor as a liquid in one or more water storage tanks.

In some embodiments, the plurality of phased wire dipole antennas for each of the broadside arrays are connected by a plurality of wire transmission lines to a common feed point.

In some embodiments, each of the wire transmission lines has a length that is about one-half of an operating wavelength.

In some embodiments, each of the plurality of phased wire dipole antennas has a length that is about one-half of an operating wavelength.

In some embodiments, the length of each of the plurality of phased wire dipole antennas is about 6 cm.

In some embodiments, each of the broadside arrays comprises a plurality of arrays of sixteen of the plurality of phased wire dipole antennas.

In some embodiments, each of the broadside arrays comprises five arrays of sixteen of the plurality of phased wire dipole antennas.

In some embodiments, each of the broadside arrays is configured to project a focused microwave beam into the surface of the landing site to aid in the sublimation of the ice.

In some embodiments, the method further comprises a microwave source connected to each of the broadside arrays via a corresponding parallel wire transmission line.

In some embodiments, the method further comprises a plurality of shunting device configured to improve coupling efficiency between the microwave source and the broadside arrays.

In some embodiments, the plurality of broadside arrays are configured to produce microwave beams that overlap in a region below the surface of the landing site.

Another aspect includes a rover vehicle for mining permafrost, comprising: a dome configured to be lowered from the rover vehicle to a surface of a landing site, the dome having a conformable skirt configured to increase gas collection efficiency and a plurality of infrared heaters configured to warm the surface of the mining location, the interior surface of the skirt having arranged thereon a plurality of phased wire dipole antennas arranged in a plurality of broadside arrays; a plurality of drilling devices configured to be deployed to enable subsurface radio frequency (RF) heating; a rotating belt configured to capture cryogenic vapors sublimated from ice at a predetermined depth within the landing site using a combination of radiation sources; and one or more water storage tanks configured to store the vapor as a liquid.

In some embodiments, the rover vehicle further comprises: a plurality of wire transmission lines configured to connect the plurality of phased wire dipole antennas for each of the broadside arrays to a common feed point.

In some embodiments, each of the wire transmission lines has a length that is about one-half of an operating wavelength.

In some embodiments, each of the plurality of phased wire dipole antennas has a length that is about one-half of an operating wavelength.

In some embodiments, the length of each of the plurality of phased wire dipole antennas is about 6 cm.

In some embodiments, each of the broadside arrays comprises a plurality of arrays of sixteen of the plurality of phased wire dipole antennas.

In some embodiments, each of the broadside arrays comprises five arrays of sixteen of the plurality of phased wire dipole antennas.

In some embodiments, each of the broadside arrays is configured to project a focused microwave beam into the surface of the landing site to aid in the sublimation of the ice.

In some embodiments, the rover vehicle further comprises a microwave source connected to each of the broadside arrays via a corresponding parallel wire transmission line.

In some embodiments, the rover vehicle further comprises a plurality of shunting device configured to improve coupling efficiency between the microwave source and the broadside arrays.

In some embodiments, the plurality of broadside arrays are configured to produce microwave beams that overlap in a region below the surface of the landing site.

DETAILED DESCRIPTION

Aspects of this disclosure relate to a shadowed polar ice (SPICE) harvester which can be used an in situ dome. Radian Gas Dynamic (RGD) mining uses a combination of microwave, radio frequency (RF), and infrared or optical heating inside an insulated dome that can be carried on a rover along with vapor capture equipment and water tanks. A rigid dome can be heated on the interior and insulated to prevent heat loss and water collection in unwanted locations. Aspects of this disclosure further describe testing apparatus and methods (e.g., cryo shroud, cryogenic vacuum, and valve and seal cycle testing) to prepare for delivery and deployment of such systems. Some dome embodiments use a 5 kW S-band magnetron power supply for 100 kg class water harvesting and a continuous flow cryobelt.

Rover Vehicle With Microwave Focusing Panels

Figure 1A:
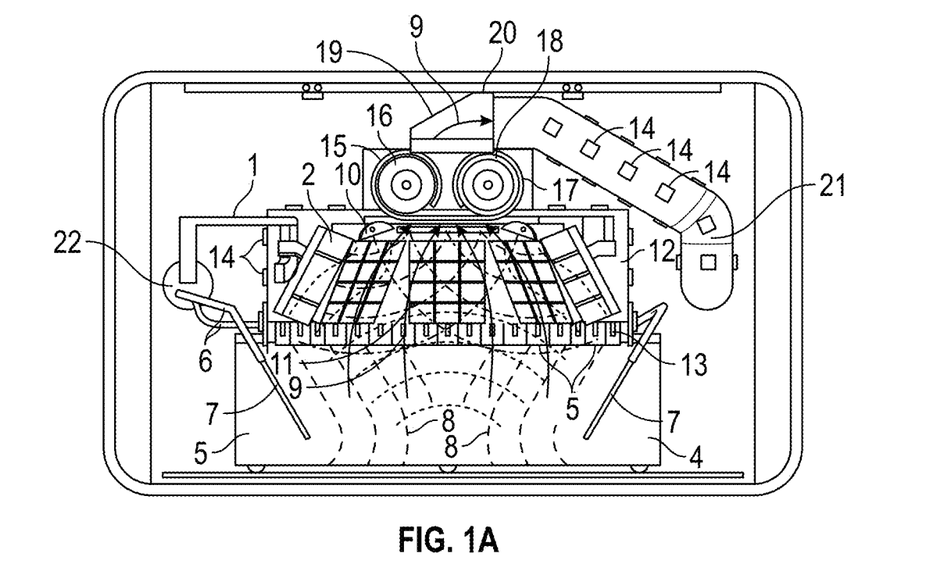
FIGS. 1A and 1B are schematic illustrations of an embodiment of an apparatus or system for implementing RGD mining, including the use of radiant gas dynamic (RGD) mining implemented in a large scale rover design.
Figure 1B:
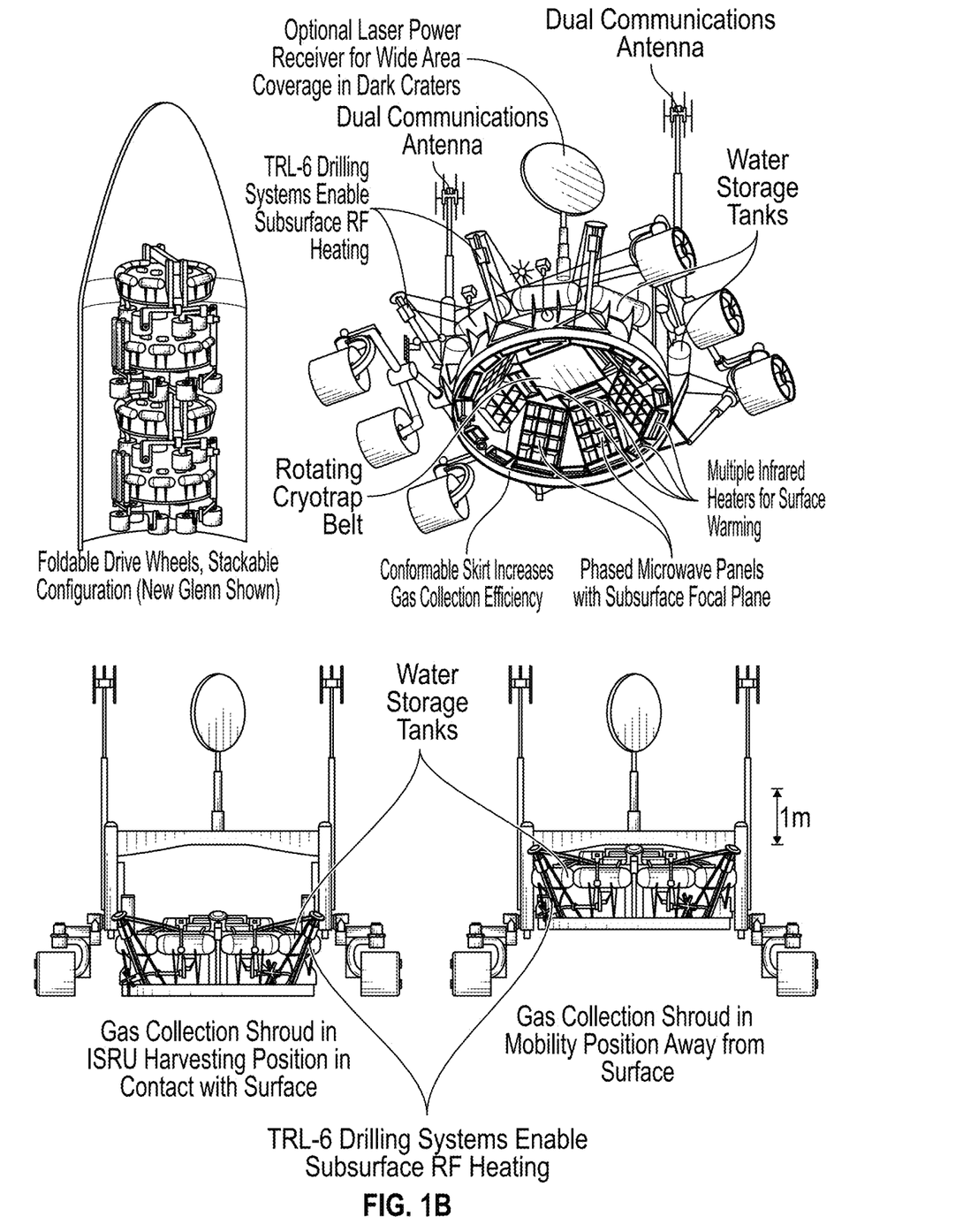

With reference to FIGS. 1A and 1B, the various features of one embodiment of an RGD mining apparatus and system will be described. These features may be incorporated into a roving vehicle or other mining apparatus or system. In this embodiment, with reference to FIG. 1A, the upper illustration shows the bottom perspective view of the dome structure of the mining apparatus, while the lower illustration is a side view. The various components illustrated in FIG. 1A are as follows:

1. Microwave Waveguide Network
2. Focusing Microwave Panels (Eight)
3. Microwave Wavefronts
4. Simulated Regolith or Permafrost
5. Simulated Surface Roughness
6. High Power RF Coax Cables
7. RF Dielectric Heating Probes (Six)
8. RF Wavefronts
9. Sublimated Water Vapor
10. Radiant Infrared Heaters (Four)
11. Infrared Radiation
12. Gas Directing Dome Structure
13. Surface Conforming Skirt Mechanism
14. Resistive Patch Heaters (Many)
15. Stainless Steel Cryobelt
16. Liquid Nitrogen Cooled Rotary Drum
17. Water Vapor Collected as Frost
18. Direction of Rotation
19. Follower Closures
20. Cryobelt Radiant Heater
21. Roughing Pump Duct
22. Vacuum System Port With reference to FIG. 1B, the upper left illustration shows a rover design in which foldable drive wheels and a stackable design allow the rover to be integrated as a payload in a space craft, such as the New Glenn. The upper right illustration shows a bottom perspective view of the unfolded, deployed rover, including the dome structure, while the lower two illustrations show two side views with the dome lowered to contact the surface and raised away from the surface.

The dome is configured to support the eight microwave focusing panels, also referred to as waveguide slotted arrays (WGSA); the power divider waveguide network; the Cryobelt vapor collection assembly; and the skirt assembly that reduces the area for volatiles to escape at an efficiency level modeled and accounted for in Table 1 of US Patent Application Publication No. 2020/0240267. The design of the embodiments of FIGS. 1A and 1B can be an assembly based on readily-obtainable materials and processes to the greatest extent possible. Materials are preferably functional at cryogenic temperatures. The skirt assembly can avoid cyclic flexing and associated fatigue risk. Preferably, the skirt assembly also provides that any leakage area between the dome and the mined surface (e.g., lunar or Martian surface) be much less than the cryopump area. Preferred structures of the dome can have multiple surfaces (e.g., have an octagonally shape) and a sufficiently supportive and protective design (e.g., aluminum walls). For example, preferred designs surround and supports the eight WGSAs and the power divider network as shown in FIGS. 1A and 1B.

Figure 2:
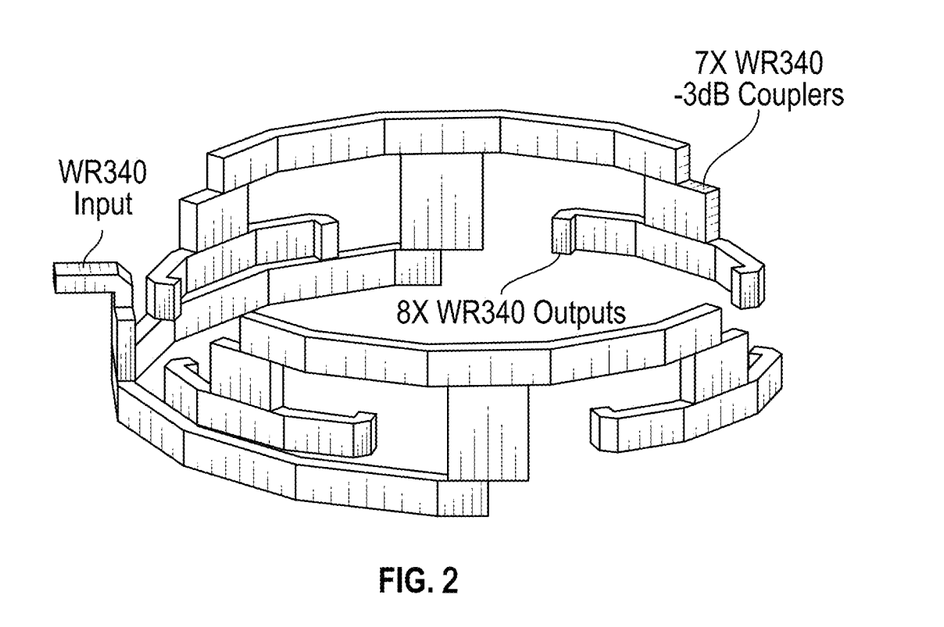
FIG. 2 is an illustration of one embodiment of a cylindrically oriented 1 to 8 waveguide power dividing network which splits power from the magnetron to the 8 WGSA focusing panels which direct the power into the permafrost.

With reference to FIG. 2, in some embodiments the arrays and the waveguide used in the power divider network are dip brazed Aluminum structures using COTS WR340 waveguide components and dimensions. Preferred embodiments of the antennae and the waveguides are sized to operate in the TE10 mode. Waveguide straight sections and bends can be dip brazed together into individual pieces, and individual pieces can be attached together using standard waveguide bolted flanges. A view of an example divider assembly is also shown in FIG. 2.

A microwave design that can be used with the described structures comprises a multi-sided (e.g., octagonal) array comprising elements in the near field of each other as shown in FIG. 1A. The electro-magnetic fields radiating from the elements can be focused slightly below a mined surface (e.g., within a ~0.03 $m^3$ volume approximately 20 cm below a mined surface, such as of the moon or mars). In some embodiments, the rectangular waveguide elements are spaced one-half wavelength apart. In the illustrated embodiment, the rectangular waveguide elements are square (e.g., 12×12 cm square) and can be excited by a TE10 mode with a given complex amplitude. The array can comprise multiple (e.g., eight) rectangular arrays (e.g., 3×4 arrays) of these square, open-ended waveguide elements that are tilted downward at about 15 degrees to facilitate focusing of the beam as shown in FIGS. 1A and 1B.

Apertures can be located at the ends of lenses (which can comprise phase shifters used to adjust the phase for each element). WGSAs with lenses can thus be used to good effect. Associated complex amplitude and phase coefficients are configured to be adjusted using a conjugate phase approach. To determine the focusing capability with the conjugate phase approach, the fields can be computed on a plane below the array (e.g., 20 cm below) as the array can be "focused" at different points along the Z-axis of the array. Phase shifting of the multiple (e.g., 8) panels can effectively direct the microwave energy down and toward the center of the system. The power density profile suggests that the focusing system can deliver nearly all 15 kW into a small region. Such a focusing process can help improve heating at given depth, thereby driving vapor upward into the dome system.

At least two microwave frequencies, 915 MHz (L-Band) and 2.45 GHz (S-Band), are well suited for penetrating and volume heating of soils. Terrestrial uses of these frequencies include cooking, curing, and drying of agricultural and many manufactured products. Magnetrons can be used as power sources in these two bands because of their high electrical efficiency. DC to microwave conversion efficiency using magnetrons are about 80% at S-band and 90% at L-Band.

L-Band commercial magnetron sources are available at continuous output power levels up to 140 kW. At 2.45 GHz, the highest power tube currently available can produce 15 kW of continuous output power. In certain embodiments, a 6 kW S-Band microwave system with magnetron, autotuner and waveguide feed system has been shown to be effective. In another embodiment, a 15 kW system is proposed.

Moving from microwave design to mechanical design, the skirt assembly can include 96 PTFE (Teflon) U-channels attached to the wall of the dome with two flathead screws each, through slots symmetrically located about the center and long enough to absorb the relative movement due to the delta CTE between the wall and the channel. In some embodiments, 48 movable skirt segments can each be 10 cm wide by 30 cm tall by 0.5 cm thick and can slide +/-6 centimeters up and down, guided by the U-channel. Skirt segments can be notched along a portion of their height to create captive features, and the fastener centered along the U-channel height can act as a stop preventing the skirt segments from sliding out of the U-channels.

In summary, FIGS. 1A, 1B, and 2 illustrate an embodiment of a rover vehicle with eight microwave focusing panels that are further described as waveguide slotted arrays (WGSA). A focused converging microwave beam can be projected downward from the rover dome into lunar regolith. The microwave beam is used to heat the frozen regolith in order to melt and volatize frozen water or other trapped volatile chemicals. The liberated vapors are collected on a cryobelt as part of the vapor collection system.

Wire Antenna Dipoles for Rover Vehicles

Figure 3A:
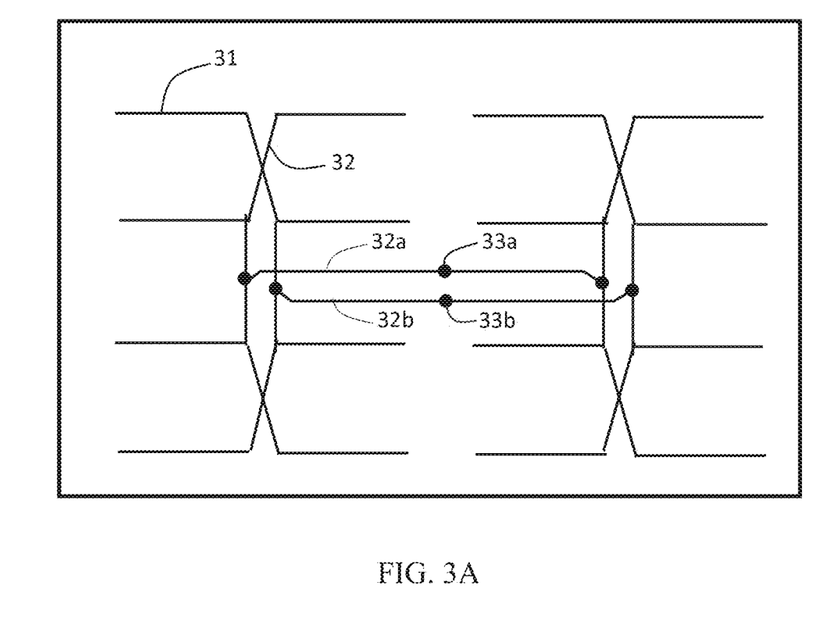
FIGS. 3A and 3B illustrates the basic configuration of a dipole array in accordance with aspects of this disclosure.
Figure 3B:
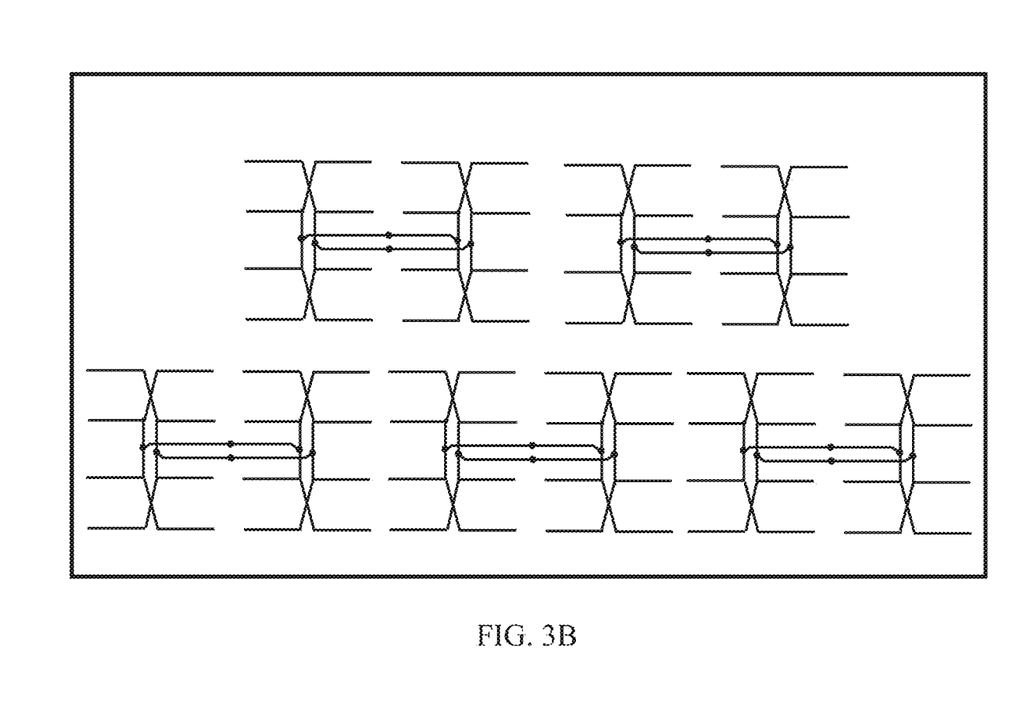
Figure 4:
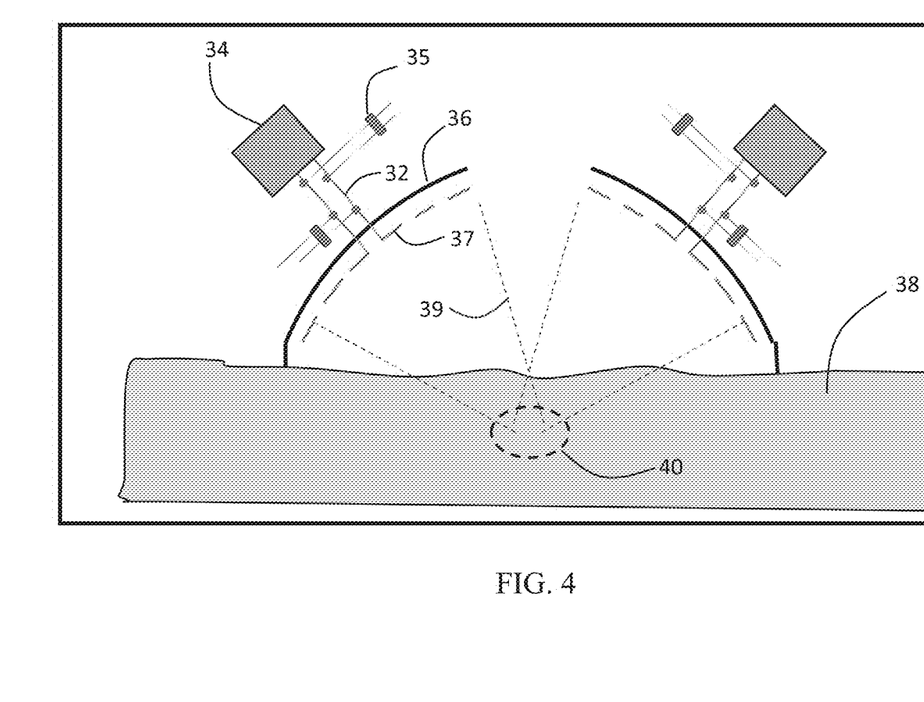
FIG. 4 illustrates the installation of a plurality of 40-element dipole arrays which are curved and installed along the inner surface of a spherical rover dome in accordance with aspects of this disclosure.

Another embodiment of the present disclosure is illustrated schematically in FIGS. 3A, 3B, and 4. In these embodiments, the WGSA panels and associated waveguide phasing networks have been replaced by a broadside phased array of dipole antennas. FIGS. 3A and 3B illustrate the basic configuration of a dipole array in accordance with aspects of this disclosure. Waveguides of the embodiment of FIGS. 1A, 1B, and 2 have been replaced by lighter and smaller wire antennas that are connected by open-wire transmission lines.

FIG. 3A illustrates an array of 16 wire dipole antennas is connected by wire transmission lines to a common feed point in accordance with aspects of this disclosure. Referring to FIG. 3A, a plurality of wire antenna dipoles 31 are about one-half wavelength long at the microwave operating wavelength. For the common microwave frequency of 2.45 GHz, the dipoles are approximately 6 cm in length. Each of the dipole antennas 31 is connected at one of its ends by a wire transmission line segment 32 which is also about one-half wavelength long. The various dipoles 31 are connected by 2-wire transmission lines 32a and 32b to common feed points 33a and 33b. The interconnected dipoles 31 of FIG. 1A constitute a basic array of 16 dipoles which can radiate a microwave beam in the broadside direction (e.g., out of the page).

FIG. 3B illustrates five arrays of 16 dipole antennas connected between their common feed points to produce a broadside array of 40 dipoles in accordance with aspects of this disclosure. That is, FIG. 3B illustrates how the basic broadside arrays of FIG. 3A may be combined into larger arrays. In the particular embodiment of FIG. 3B, the larger array comprises an array of 40 dipoles. The illustrated array measures approximately 50 cm wide by 40 cm high in certain embodiments.

FIG. 4 illustrates the installation of a plurality of 40-element dipole arrays which are curved and installed along the inner surface of a spherical rover dome in accordance with aspects of this disclosure. With reference to FIG. 4, the 40-element dipole arrays 37 may be installed on the inner spherical surface of a rover dome 6. The plurality of dipole arrays can be used to project powerful focused microwave beams into the lunar regolith. The region below the surface is heated by the focused microwave beams, which drives volatile gases upwards to be collected (e.g., by rover cryotraps).

In this figure, a high-power microwave source 34 is connected to the array 37 by a parallel wire transmission line 32. A plurality of shunt tuning devices 35 can be adjusted for maximum (or to improve) coupling efficiency of microwave power between the source 34 and the antenna array 37. Each of the antenna arrays 37 launches a converging microwave beam 39 into the lunar regolith 38. The multiple converging beams 39 overlap in a region 40 below the surface of the regolith. The heated region 40 then drives volatile gases upwards to be collected by the rover cryotraps.

In this manner, the dipole broadside arrays 37 can deliver the same subsurface heating performance as the waveguide slotted arrays (WGSA) of FIGS. 1A, 1B, and 2 but with a lower weight and a more volumetrically compact design. The savings in weight and volume increase proportionally for larger rover domes and for microwave sources with longer wavelength.

What is claimed is:

1. A method for mining lunar polar permafrost to extract gas propellants, comprising:
   providing a rover vehicle for mining permafrost from a landing site, the rover vehicle configured to combine radio frequency (RF), microwave, and infrared radiation to heat the permafrost at a depth control heating profile;
   lowering a dome from the rover vehicle to a surface of the landing site, the dome having a conformable skirt configured to increase gas collection efficiency and a plurality of infrared heaters configured to warm the surface of the mining location, the interior surface of the skirt having arranged thereon a plurality of phased wire dipole antennas arranged in a plurality of broadside arrays;
   deploying from the rover vehicle a plurality of drilling devices configured to enable subsurface RF heating;
   sublimating ice at a predetermined depth, using a combination of radiation sources, to cause water vapor to migrate upward and out of the permafrost;
   using a rotating belt to capture cryogenic vapors; and
   storing the vapor as a liquid in one or more water storage tanks.

2. The method of claim 1, wherein the plurality of phased wire dipole antennas for each of the broadside arrays are connected by a plurality of wire transmission lines to a common feed point.

3. The method of claim 2, wherein each of the wire transmission lines has a length that is about one-half of an operating wavelength.

4. The method of claim 1, wherein each of the plurality of phased wire dipole antennas has a length that is about one-half of an operating wavelength.

5. The method of claim 4, wherein the length of each of the plurality of phased wire dipole antennas is about 6 cm.

6. The method of claim 1, wherein each of the broadside arrays comprises a plurality of arrays of sixteen of the plurality of phased wire dipole antennas.

7. The method of claim 1, wherein each of the broadside arrays comprises five arrays of sixteen of the plurality of phased wire dipole antennas.

8. The method of claim 1, wherein each of the broadside arrays is configured to project a focused microwave beam into the surface of the landing site to aid in the sublimation of the ice.

9. The method of claim 1, further comprising a microwave source connected to each of the broadside arrays via a corresponding parallel wire transmission line.

10. The method of claim 9, further comprising a plurality of shunting device configured to improve coupling efficiency between the microwave source and the broadside arrays.

11. The method of claim 1, wherein the plurality of broadside arrays are configured to produce microwave beams that overlap in a region below the surface of the landing site.

12. A rover vehicle for mining permafrost, comprising:
a dome configured to be lowered from the rover vehicle to a surface of a landing site, the dome having a conformable skirt configured to increase gas collection efficiency and a plurality of infrared heaters configured to warm the surface of the mining location, the interior surface of the skirt having arranged thereon a plurality of phased wire dipole antennas arranged in a plurality of broadside arrays;
a plurality of drilling devices configured to be deployed to enable subsurface radio frequency (RF) heating;
a rotating belt configured to capture cryogenic vapors sublimated from ice at a predetermined depth within the landing site using a combination of radiation sources; and
one or more water storage tanks configured to store the vapor as a liquid.

13. The rover vehicle of claim 12, further comprising:
a plurality of wire transmission lines configured to connect the plurality of phased wire dipole antennas for each of the broadside arrays to a common feed point.

14. The rover vehicle of claim 13, wherein each of the wire transmission lines has a length that is about one-half of an operating wavelength.

15. The rover vehicle of claim 12, wherein each of the plurality of phased wire dipole antennas has a length that is about one-half of an operating wavelength.

16. The rover vehicle of claim 15, wherein the length of each of the plurality of phased wire dipole antennas is about 6 cm.

17. The rover vehicle of claim 12, wherein each of the broadside arrays comprises a plurality of arrays of sixteen of the plurality of phased wire dipole antennas.

18. The rover vehicle of claim 12, wherein each of the broadside arrays comprises five arrays of sixteen of the plurality of phased wire dipole antennas.

19. The rover vehicle of claim 12, wherein each of the broadside arrays is configured to project a focused microwave beam into the surface of the landing site to aid in the sublimation of the ice.

20. The rover vehicle of claim 12, further comprising a microwave source connected to each of the broadside arrays via a corresponding parallel wire transmission line.

21. The rover vehicle of claim 20, further comprising a plurality of shunting device configured to improve coupling efficiency between the microwave source and the broadside arrays.

22. The rover vehicle of claim 12, wherein the plurality of broadside arrays are configured to produce microwave beams that overlap in a region below the surface of the landing site.

* * * * *